June 7, 1932. W. T. SNYDER 1,862,067
ADJUSTABLE SEED PLANTER AND FERTILIZER
Filed March 20, 1930 6 Sheets-Sheet 1

Inventor
W. T. Snyder
By Watson E. Coleman
Attorney

June 7, 1932. W. T. SNYDER 1,862,067
ADJUSTABLE SEED PLANTER AND FERTILIZER
Filed March 20, 1930   6 Sheets-Sheet 6

Inventor
W. T. Snyder
By Watson E. Coleman
Attorney

Patented June 7, 1932

1,862,067

UNITED STATES PATENT OFFICE

WILLIAM T. SNYDER, OF SODUS, NEW YORK

ADJUSTABLE SEED PLANTER AND FERTILIZER

Application filed March 20, 1930. Serial No. 437,483.

This invention relates to seed planters such as are used for planting beans, corn and other crops wherein the seeds are planted in hills arranged in rows.

One of the objects of the present invention is to provide a seed planter of this character which is so constructed that any desired distance may be secured between the rows within the range of the machine.

A further object is to provide a planter wherein the distance between the hills may be regulated.

A further object is to provide a planter so constructed that fertilizer will be discharged along with the seed.

A still further object is to improve upon the means for feeding or discharging seeds from the seed hopper and to provide very simple means whereby the distance traversed by the machine between one planting and the next following planting may be controlled, this means preferably comprising a circumferentially corrugated wheel, the corrugations being arranged in a plurality of zones, the corrugations in one zone being nearer to each other than the corrugations in the next adjacent zone.

A further object is to provide improved means whereby the fertilizer may be taken from the fertilizer hopper and discharged into the fertilizer spout and from thence to a point where the seed is deposited.

Another object is to provide means whereby either or both of the seed planting devices and their corresponding fertilizer discharging means may be operated so as to provide for planting the fertilizer in one row or two rows as desired.

Other objects will appear in the course of the following description.

My invention is illustrated in the accompanying drawings, wherein:—

Figure 12 is a vertical sectional view through the lower end of the planter and fertilizer spouts;

Figure 13 is a section on the line 13—13 of Figure 12;

Referring to these drawings, 10 designates the supporting frame of the machine which is shown as rectangular in form, this supporting frame being mounted upon a sectional axle 11 which extends transversely of the frame of the machine and is mounted in suitable bearings 12 and carries the traction wheels 13. These traction wheels are keyed upon the axle as by the keys 14 and are adapted to be shifted in or out to increase or decrease the wheel base and to be held in their shifted positions by said screws or other means.

Extending from front to rear of the frame are the two frame bars 15 forming part of the frame itself and rigid therewith. These also carry bearings 12 for the axle 11. Pivoted upon the annular knuckles 16 is the tongue 17, this tongue being braced by the braces 18 and braces 19.

The braces 18 are slotted at their ends and angularly bent for the reception of the bolt 20 and the braces 19 are also angularly bent and slotted for the reception of the same bolt. This permits the tongue to be adjusted up or down as desired. Suitable draft appliances are to be attached to the tongue, these being shown as comprising the usual evener bar 21 and whiffle-trees connected thereto.

Mounted upon the transversely extending forward and rear members of the frame 10 and extending forward and rearward are two frames, each designed to support a fertilizer hopper and a seed hopper and the attendant mechanism thereof. These supporting frames are alike and are disposed one on each side of the middle of the machine and are adjustable transversely toward or from the middle of the machine. As illustrated, these supporting frames each consist of the longitudinal supporting beams 22 connected by transverse supporting members of any suitable character. The beams 22 are held in spaced relation to each other and the frames formed by the supporting beams 22 and the transverse members are adjustable upon the forward and rear frame bars of the frame 10 and are held in their adjusted position by pins or bolts 23 passing through the ends of the frames and through apertures 24 in the frame 10. Mounted in bearings in the frame bars 15 and adjacent the rear end of the machine is a tubular shaft section 25. Mounted in bearings 26 on each of the shiftable frame bars 22 is a shaft section 27 which telescopes into the shaft section 25. Any means may be provided for giving rotative engagement to the shaft sections 27 from the shaft sections 25, but preferably I provide clutch members 28 mounted upon the extremities of the tubular shaft section 25 and complementary clutch members 29 adjustably mounted upon the shaft sections 27.

These clutches 29 are held in place on the shaft sections 27 by means of set screws. Thus when the supporting bars 22 are adjusted toward each other or away from each other, the clutch members 29 are released from engagement with the shaft sections 27 and shifted along these shaft sections until they have proper engagement with the clutch members 28.

Mounted upon each of the frames 22 adjacent the rear end thereof is a fertilizer hopper 30 shown as rectangular in form with rounded corners. Each fertilizer hopper is provided with a suitable cover so that when the cover is open, the fertilizer hopper may be filled with fertilizer. The rear end of each fertilizer hopper is hinged as at 31 to the frame beams 22 and a door or gate 32 is provided at the front of the hopper adjustably engaged by a set screw 33. Forming a floor beneath each fertilizer hopper are hard wood blocks 34 through which shafts 27 and 35 pass, the shaft 35 being disposed at the forward end of the hopper. The hard wood blocks are spaced apart from each other as at 36 and mounted upon the shafts 27 and 35 are the sprocket wheels 37 over which passes a sprocket chain 38. This chain is formed, as usual, of a plurality of sprocket links.

Figure 5:
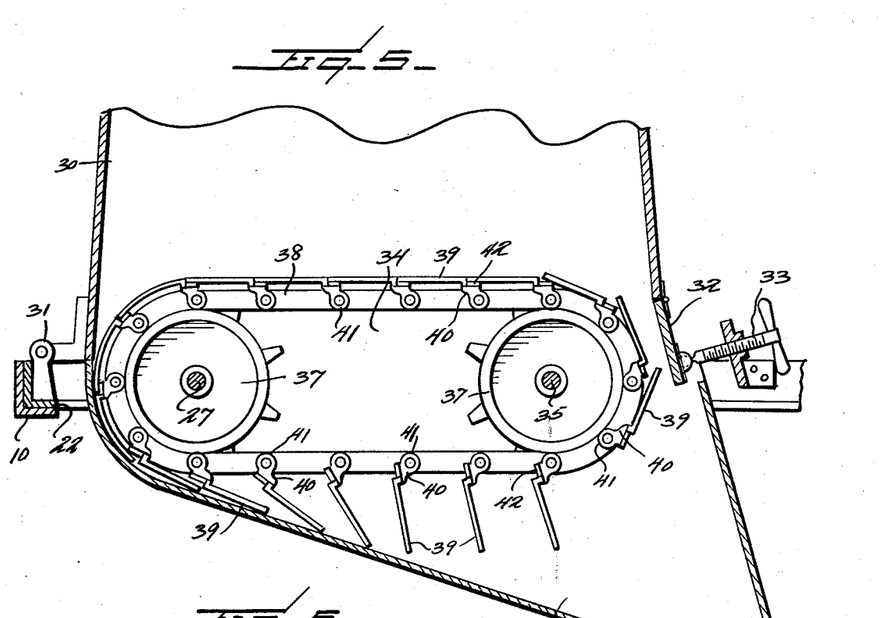
Figure 5 is a fragmentary vertical section through the fertilizer hopper and spout and showing the fertilizer feeding mechanism in elevation.

Hingedly mounted upon these links are a plurality of blades 39 attached to clips 40 having angular lugs 41 which are directly pivoted to the sprocket links, these blades 39 being disposed normally parallel to the upper flight of the sprocket chain 38. Each blade is offset at its forward portion as at 42 and the blades overlap each other, as shown in Figure 5, while they move beneath the hopper 30.

As they move around the forward sprocket wheel 37, the links tip upward so as to discharge the fertilizer downward between the flight of the chain and the door 32 into the spout 43 which extends downward and forward and has its lower end entered into a tapering auxiliary spout or continuation 44 which is supported as will be later described. The upper end of the spout 43 extends rearward beneath the entire flight of the sprocket chain 38 so that any fertilizer discharged from this chain will be discharged into the spout. Thus as this chain operates, it will continually carry off from the fertilizer hopper 30 a certain amount of fertilizer which will be continuously discharged into the spout and be discharged downward onto the ground. By lifting the fertilizer hopper, access may be had to the conveyor formed by the sprocket chain and its plates 39 so that this may be repaired or replaced when necessary.

Figure 3:
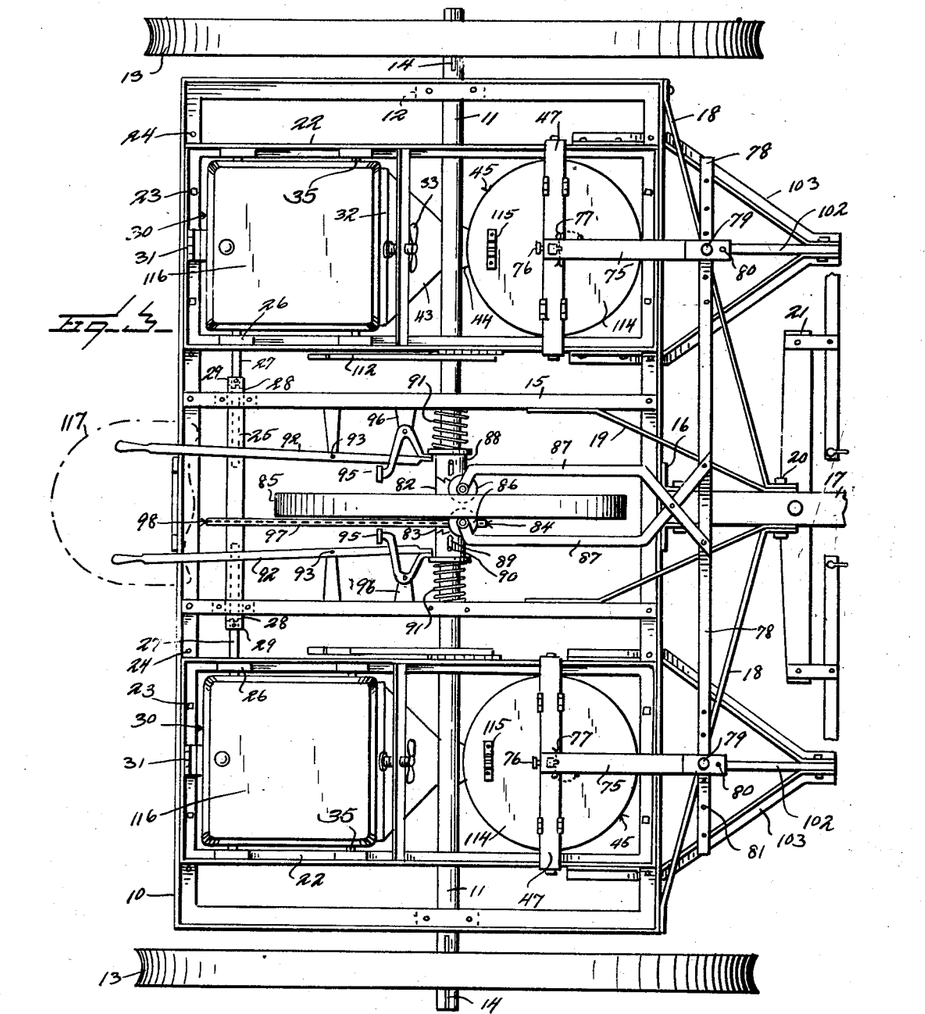
Figure 3 is a top plan view of a planter constructed in accordance with my invention.
Figure 4:
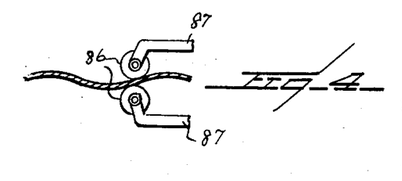
Figure 4 is a fragmentary section concentric to the center of the planter operating disk.
Figures 6, 7:
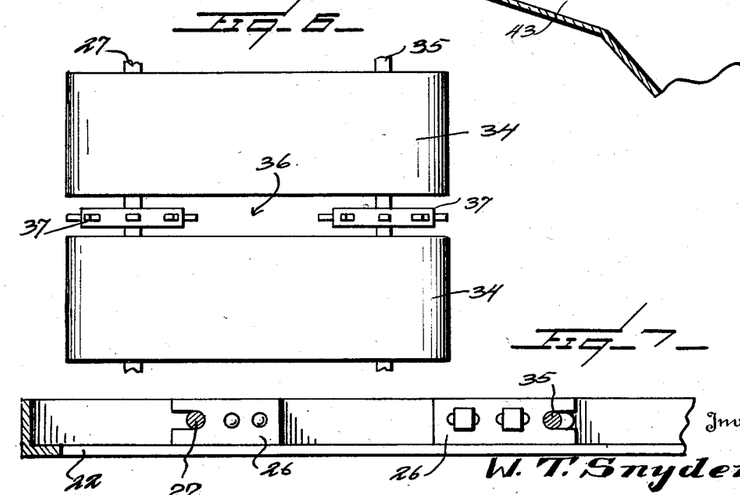
Figure 6 is a top plan view of the fertilizer conveyor.
Figure 7 is a side elevation of the frame for supporting the sprocket wheel shafts on the fertilizer feeder, the shafts being shown in section.
Figure 8:
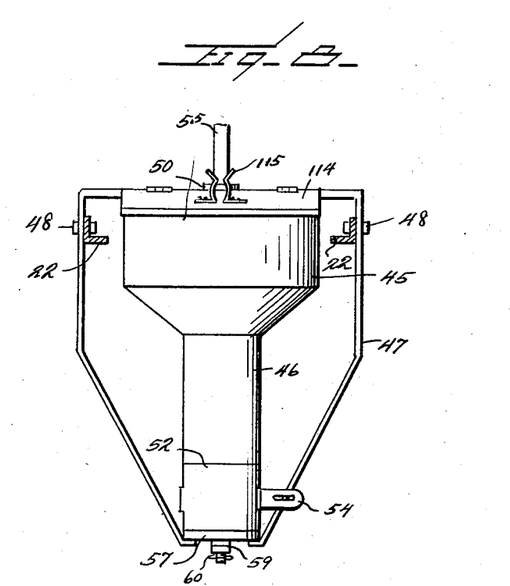
Figure 8 is a front elevation of the planter hopper and supporting frame.
Figure 9:
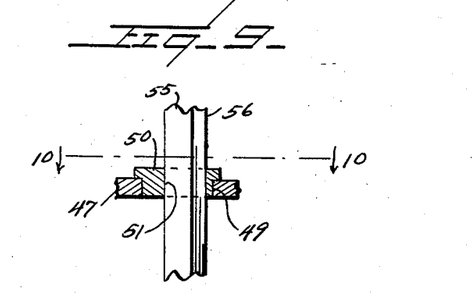
Figure 9 is a fragmentary section through the top of the planter hopper showing the shaft in elevation.
Figure 10:
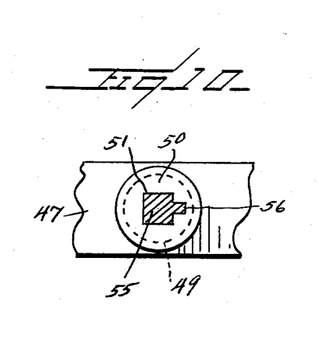
Figure 10 is a section on the line 10—10 of Figure 9.
Figure 11:
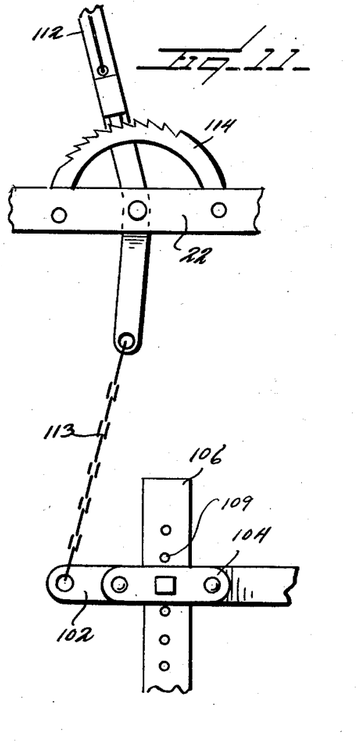
Figure 11 is a fragmentary elevation showing the means whereby the frame supporting the furrow opener is raised or lowered.
Figure 14:
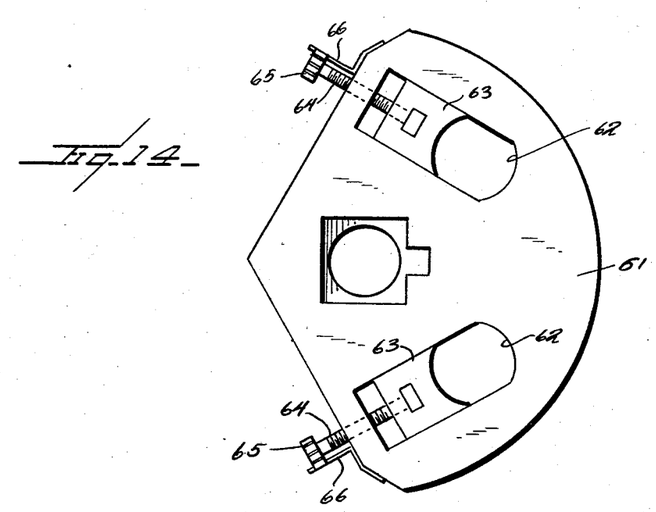
Figure 14 is a top plan view of the seed disk.
Figure 15:
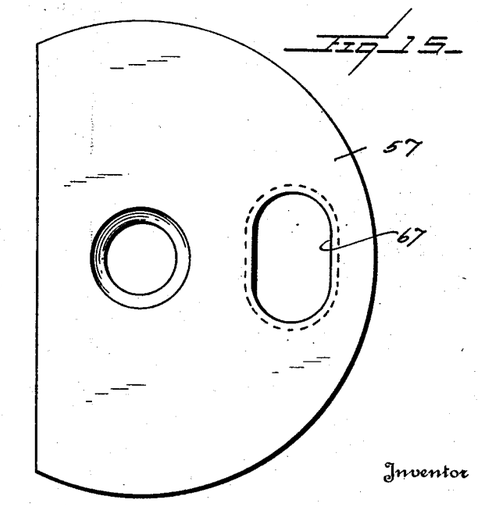
Figure 15 is a top plan view of the bottom of the planter spout.

As will be seen in Figure 3, the frames 22 are provided with bearings for the shafts 27 and 35. These bearings, as illustrated in Figure 7, are adjustable relative to each other so as to take up any looseness in the chain.

Disposed upon the beams 22 and supported thereby are the seed hoppers 45 one for each of the frames 22. Each of these hoppers has a relatively large upper portion and a downwardly extending spout 46. Each hopper is supported by a frame 47 which extends across the top of the hopper, downward on each side thereof, downward to a point beneath the spout where the frame extends inward so that the hopper rests upon the frame. This frame is formed with perforations on each side member of the frame through which bolts 48 pass into the frame bars 22. Thus this frame 47 with the hopper may be vertically adjusted.

The top element of the frame 47 is provided with a central opening 49 wherein is disposed a plug-like member 50 having an opening 51 extending through it through which the shaft of the seed discharging plate passes, as will be later stated. The lower end of the spout 46 is provided with a door 52 which is hinged on one side and may be provided with any suitable latch, the exterior of this door being formed with an eye 53 into which the lower end of the auxiliary spout 44 engages so as to support the spout 44 at its lower end. The seed hopper may be latched to the frame 47 by means of a hasp 54 which will extend through a slot or be otherwise engaged with the frame 47.

Extending downward through the top of the seed hopper 45 is a shaft 55. This shaft in cross sectional view is square or rectangular and provided with the laterally projecting tongue or rib 56. The lower end of the feed hopper is closed by a plate 57 and the lower end of the shaft is reduced and circular in cross section and passes through the plate and supported by the ball bearings 58, the extreme lower end of the shaft being screw-threaded for the reception of the nuts 59 held in place by a cotter pin 60. The bearing plug 50 previously described has a central opening 51 which fits the shaft 55 and through which the shaft 55 passes. Thus this shaft 55 constitutes a bearing where it passes through the frame 47. The lower end of this shaft carries upon it the seed plate 61. This seed plate is segmental in form and is provided with an opening for the reception of the shaft 55 so that the seed plate will oscillate with this shaft. The seed plate is recessed on its under face so as to rest upon the bearing balls 59. On this plate is disposed the shield plate 61a.

Figure 16:
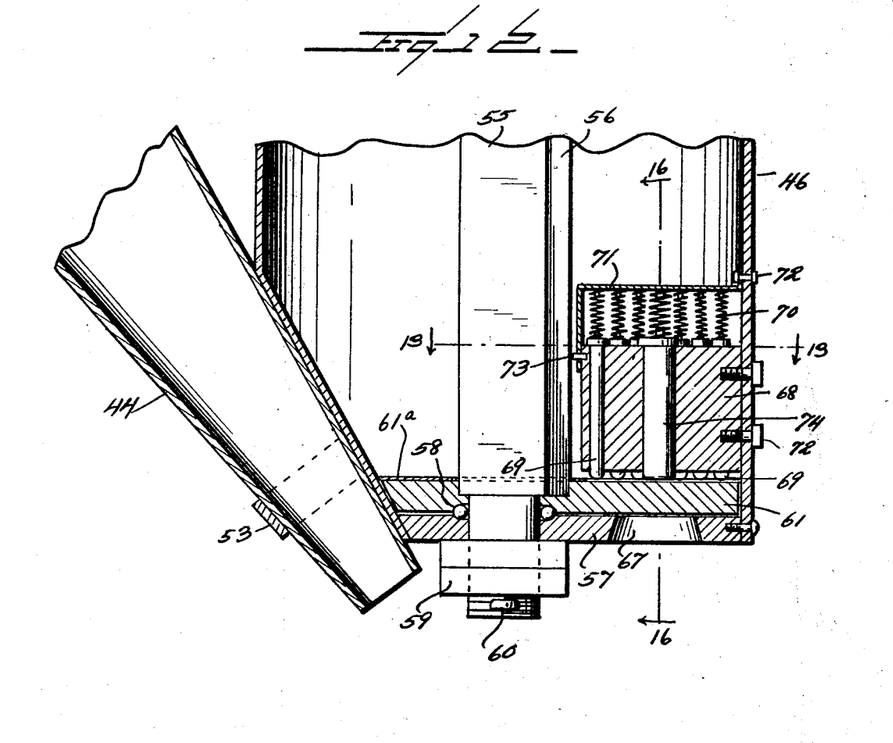
Figure 16 is a transverse section on the line 16—16 of Figure 13.
Figure 17:
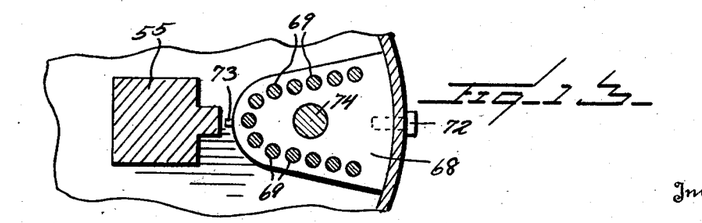

This seed plate is provided with two slots 62 extending in convergent relation to each other and operating within each of these slots is an adjustable block 63 adjusted by means of a screw 64 swiveled in the block, the screw 64 extending out through the edge wall of the seed plate and being provided with a serrated head 65 engageable by a spring latch 66 mounted on the side wall of the seed plate. Thus the block 63 will be held in its adjusted position. The adjacent end walls of the opening 62 are curved concavely and the opposed edge face of the block 63 is also curved concavely and this edge face is beveled downward and outward, as shown in cross section in Figure 16. The openings 62 also have downwardly and outwardly beveled walls so that the seed may readily drop through these openings.

The plate 57 is provided with an opening 67 and as the seed plate 61 is oscillated, the openings 62 will alternately come over this opening 67 so as to discharge the seed contained within the opening 62 downward through the opening 67. This opening 67 is also beveled or flared downwardly so as to permit the ready discharge of the seeds or grains. Mounted upon the wall of the seed hopper is a brush for sweeping the seeds from the top of the seed plate, this brush being located immediately over the opening 67. The brush comprises a block 68 attached by screws to the wall of the seed hopper and having an approximately semi-circular or semi-oval series of openings therein in which are disposed pins 69. Each of these pins is headed at its upper end so that it can not drop through the opening and is urged downward by a spring 70, these springs at their lower ends bearing over nipples projecting upward from the upper ends of the pins.

The springs at their upper ends extend around lugs formed upon a plate 71 attached to the wall of the hopper by a bolt 72, this plate being angular so as to extend around the rim of the block 68, the block having a lug 73 engaging in an opening in the margin of this cover 71 so as to lock the cover in place, but permit it to be removed when desired.

The pins 69 extend downward below the floor 68 and into approximate contact with the seed plate 57. Thus, as the seed plate oscillates in one direction to carry the opening 62 into alinement with the opening 67, surplus seed above the level at the upper face of the plate will be swept aside and held from discharge through the opening 67.

Preferably the block 68 is provided with a central opening in which is disposed a rather large pin 74 forced downward by a spring just as are the other pins 69, this pin 74 acting to force the seed or seeds downward through the openings 62 and 67 when these openings are in alinement with each other.

For the purpose of oscillating the seed plate and the shaft 55 upon which the seed plate is mounted, I mount upon this shaft 55 the vertically adjustable arm 75 which is held in vertically adjustable position upon the shaft 55 by means of the set screw 76 and additionally by means of the cotter pin 77 passing through any one of a plurality of openings in the rib 56. This arm 75 has an opening which snugly fits the shaft 55 and the extremity of the arm is bifurcated to receive a cross bar 78, the cross bar being held in place by means of a removable pin 79 extending through the perforated portion of each arm 75.

The extremity of the bifurcated portion may be provided with a supplemental opening 80 through which the pin 79 may be dropped when it is desired to disconnect the arm from the cross bar 79 but when the pin 79 is engaged with the cross bar 78 in any one of a plurality of openings 81, any reciprocation of the cross bar 78 will cause an oscillation of the shafts 55 and consequent operation of the two seed plates in the two seed hoppers.

Figure 1:
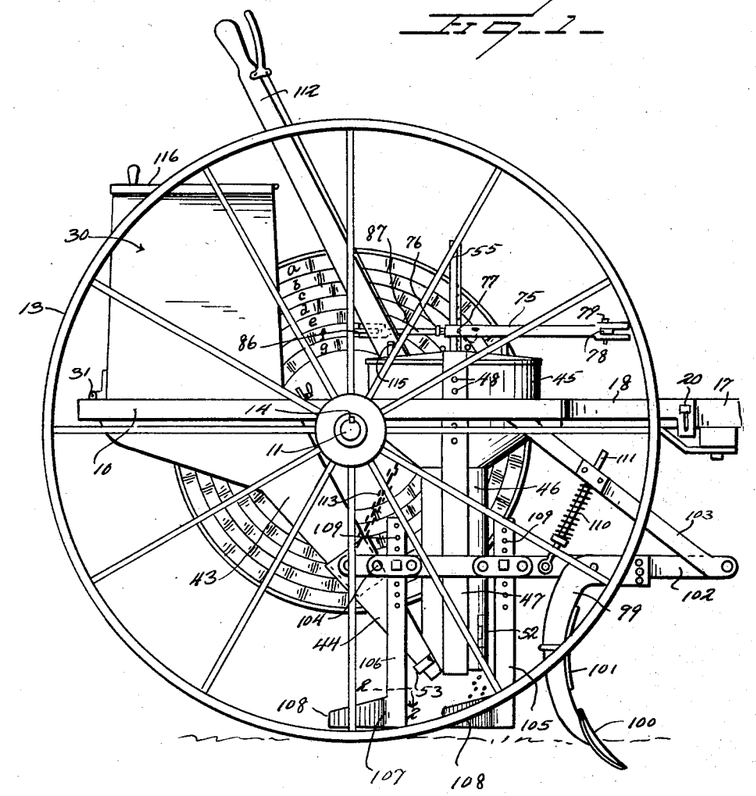
Figure 1 is a side elevation of a planter and fertilizer constructed in accordance with my invention.

To cause reciprocations of the bar 78, I dispose between the two sections of the axle 11 the sleeve 82 which is formed with opposed clutch teeth 83, these teeth being ratchet teeth. This sleeve 82 carries upon it the sprocket wheel 84 and the sleeve 82 constitutes the hub of a wheel 85. This wheel 85 as shown in Figure 1 is formed with a plurality of circumferentially extending tracks which are lettered $a$, $b$, $c$, $d$, $e$ and $f$. Each of these tracks is sinuous in section concentric to the center of rotation of the wheel and the crests of the sinuosities or corrugations in one track are spaced from each other a different distance from the crests or corrugations on the next adjacent tracks.

Coacting with this wheel 85 which may have a flat rim are the opposed rollers 86 which are disposed a distance from each other just equal to the thickness of the wheel so that one roller will travel into the valleys of a corrugation while the other roller is riding over the crest of the same corrugation. These rollers are preferably mounted upon crossed bars 87 which are attached to the reciprocating bar 78 and cause it to reciprocate as the wheel 85 passes between the rollers 86. The reciprocation of the bar 78 causes the oscillation of the arms 75 which in turn causes the oscillation of the shaft 55 and the oscillation of the corresponding seed plate.

This wheel 85 is a very important feature of my invention as it acts to space the distance apart at which seeds are planted. The wheel through suitable clutches 88 is clutched to the axle 11 and, therefore, makes one complete rotation with each complete rotation of the traction wheels 13. The outermost zone or row $a$ has its corrugations so spaced apart as to cause a reciprocation of the cross bar 78, once for each twelve inches of the travel of the machine so that the hills will be planted twelve inches apart when the rollers 86 are engaged in the track or zone $a$. The sinuosities in the track or zone $b$ are so spaced apart as to cause the hills to be planted sixteen inches apart, the next zone $c$ to cause the hills to be planted ten inches apart, the next twenty-four, the next twenty-eight, the next thirty-two, and the zone $g$ to cause the hills to be planted thirty-six inches apart. The arms 75 are adjustable upon the vertical shafts 55 so as to bring the cross bar 28 into any desired vertically adjusted position and thus bring the rollers 86 into adjustment with any desired zone of the tracks $a$, $b$, $c$, $d$, $e$, $f$ or $g$.

As before stated, the wheel 85 is normally clutched to the shaft or axle 11 by means of either clutch 88. These are mounted for rotation with the shaft 11, but also mounted for longitudinal movement with relation thereto by means of the slot 89 in each of these clutches 88, this slot being intersected by a pin 90 passing through the shaft. A spring 91 acts to urge the corresponding clutch 88 toward the clutch teeth on the sleeve or hub 82. Levers 92 are provided pivoted at 93 upon the frame of the machine by which the clutches may be shifted outward against the action of the springs or allowed to engage with the clutch teeth 83.

Either of these levers 92 or both of them are adapted to be engaged by latching device 94 mounted upon the rear cross bar of the main frame or in any other suitable location. When so latched, the corresponding clutch is held out of engagement with the clutch teeth 83 on the hub 82. In addition to the hand operated levers 95, I provide the foot operated levers 95 adapted to be pivoted upon a bracket 96, one end of the foot operated levers engaging the corresponding clutch member 88 and when this pedally operated lever is depressed, it will be obvious that the clutch will be drawn out of engagement with the hub 82. These pedally operated levers, 95, therefore, provide means whereby the clutch may be momentarily released on either side of the hub 82. These clutches will also operate to permit a differential movement of the wheels 13 as when the machine is turning a curve. By withdrawing both of the clutches 88, the wheel 85 may be turned by hand to deposit seeds in line with seeds which have been already deposited on another journey of this machine. This is particularly necessary where the field is uneven and irregular in form.

As before stated, there is mounted upon the hub 82, the sprocket wheel 84 from which passes a sprocket chain 97 which passes over a sprocket wheel 98 mounted upon the tubular shaft section 25 which drives the fertilizer distributing chains. Thus by releasing the clutches 88, the seed planting stops and the deposit of fertilizer also stops.

Disposed immediately in front of the spout of each seed hopper 45 is a tooth or plow shank 99 which carries at its end a removable tooth 100 which is normally disposed to form a relatively shallow furrow in the ground if desired.

Figure 2:
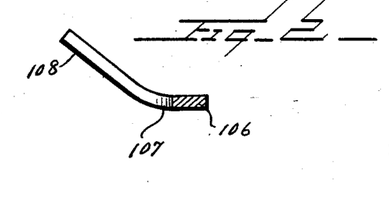
Figure 2 is a section on the line 2—2 of Figure 1.

This shank 99 carries upon it the shield 101 preventing earth from being piled up in front of the spout of the seed hopper 45. The shank 99 at its upper end is angularly bent and is adjustably mounted upon a bar 102, the forward end of this bar being pivotally mounted upon downwardly and forwardly extending braces 103. This bar carries upon it the clips 104 and disposed between these clips and the bar are the shanks of the seed coverers 105 and 106. Each of these shanks is twisted at 107 and then extends rearward and inward so that the foot 108 of the shank 105 is disposed at its rear end slightly beyond the point where the seeds are dropped as shown in Figure 2 so that it acts to partially cover the seeds and partially cover the fertilizer which is discharged from the auxiliary spout 44. The foot 108 of the shank 106 is disposed adjacent the rear end of the bar 102 and acts to fully cover the seeds. Each of the shanks 105 and 106 are provided with a vertical series of apertures 109 and a bolt passes through these apertures and through the corresponding clip 104 and the bar 106 so as to hold these coverers in any adjusted position.

A spring 110 which surrounds a rod 111 urges the rear end of the bar 102 downward but this bar may be vertically adjusted to raise or lower the shank 99 of the furrow opener 100 or the coverers 105 and 106 by means of the lever 112. This lever is pivoted on the main frame just forward of the fertilizer hopper and is connected by a chain 113 to the rear end of the corresponding bar 102. This lever operates over an arcuate rack 114 and has a hand-operated latch of common construction whereby it may be latched between any two of the rack teeth.

These rack teeth are preferably ratchet teeth so that the lever 112 may be drawn rearward without having to lift the bolt or latch. Thus the depth of action of the furrow opener 100 may be adjusted and thus the furrow opener may be entirely raised from the ground at the time when the seed dropping and fertilizer dropping mechanism is out of action to permit the machine to travel all over the place where the planting is to be done. The seed hopper is preferably closed at the top, as for instance, by means of the segmental covers 114 of which there are two, hinged to the top cross bar of the frame 47, this top cross bar being preferably of channel iron. Each of these lids 114 is provided with a spring clip 115 adapted to embrace the shaft 55, when the lever is turned upward, the spring clips 115 being disposed at distances from the edge of the cover so that both lids may be raised at the same time. The cover of the fertilizer hopper is designated 116 and is hinged at one side so that it may be raised and is provided with a knob.

The operation of this mechanism will be clear from what has gone before. As the machine is driven down the row, the corrugations in the wheel 85 act to oscillate the seed plates so as to carry one or the other of the openings over the opening 67 in the plate 57. Thus while one of the openings 62 is filling with seed, the other is discharging its seed. The brushes act to sweep off the top of the seed plate and prevent the discharge of any seed except what is contained in an opening 62 when one of the openings 62 is disposed in register with the opening 67. At the same time that the seed is discharged, fertilizer is being discharged from the hopper 30 behind and into the furrow formed by the furrow opener 100.

The seed and fertilizer are partially covered with earth by the cover 105 and then the full covering of earth is secured by the coverer 106. The amount of fertilizer which is discharged may be controlled by the gate 32 on the fertilizer hopper. It will be seen that as the endless chain 38 passes around the forward sprocket wheel 38, the plates 39 swing down to a depending position so that all the fertilizer on the seed plates is cast downward into the rearward extension of the spout 43. The distance apart of the hills or places depositing the seed are controlled by adjusting the arm 75 upon the shafts 55 so as to bring the rollers 86 into engagement with one or the other of the several tracks or zones $a$ to $g$. The distance apart of the rows is secured by adjusting the supporting frames 22 toward or from each other upon the main frame 10, this adjustment, of course, being accompanied by a corresponding adjustment of the clutch members 29 on the shafts 27. The wheels may be adjusted toward or from each other for different rows also. A seat 117 for the driver is mounted upon the frame in the usual manner. Foot rests 118 are provided for the feet of the driver.

The purpose of providing the two axle sections 11 with the intermediate sleeve 82 and the two spring actuated clutches 88 is to provide for circumstances under which one wheel will run slower than the other wheel or remain stationary as when the machine is turning a corner or when some obstruction prevents one wheel from moving as fast as the other. Under these circumstances, of course, as is well understood, the other freely moving wheel or faster moving wheel will drive the planter controlling wheel 85 but where the operator desires to entirely stop the movement of the planter wheel while the machine is moving forward, the operator then releases both clutches either by the actuation of the hand lever 92 or the foot levers 95. The operation of one or the other planting mechanism is secured by disconnecting one or the other of the planting operating arms 75 from the rod 78 or shifting it out of its operative position entirely.

In Figure 5, I have illustrated the plates 39 which are connected to the endless elements 38 as being rather large. This is so as to make the drawing clear, but in actual practice, each joint of this sprocket chain 38 should be about five-eighths of an inch from center to center.

The thin plate 61a disposed above the plate 61 is for the purpose of covering a portion of plate 61 so as to keep seed from lodging in the openings 62 at the rear ends of the blocks 63 and the parts 64 and 65.

While I have illustrated a construction which I believe to be particularly effective for the purpose intended, I do not wish to be limited to all of the details of the construction except as defined in the appended claims as it is obvious that many changes might be made in the arrangement of parts and details of construction.

I claim:—

1. In a seed planter of the character described, a planting mechanism, seed dropping mechanism therefor, and means for actuating the seed dropping mechanism at selected intervals including a wheel having a plurality of concentric series of alternate elevations and depressions, the elevations of one series being spaced from each other a different distance than the elevations of any other series, and means adjustable into engagement with any one of said series, said means being operatively connected to the seed dropping mechanism.

2. A planter including a supporting frame having traction wheels and an axle, a seed planting mechanism including a seed hopper and an oscillatable seed dropping plate mounted in the bottom of the hopper, a vertically disposed shaft for said plate extending upward out of the hopper, a wheel carried by the axle and having a plurality of series of elevations and depressions concentric to the center of the wheel, the elevations of one series being differently spaced from the elevations of another series, an arm mounted upon the shaft for vertical adjustment, a transversely extending rod carried by said arm, and a pair of rollers carried upon said rod and disposed one on each side of the wheel and engageable with any one of said series of elevations and depressions on the wheel dependent upon the adjustment of the arm on the shaft.

3. In a planter of the character described, a supporting frame, traction wheels therefor, an axle rotated by the traction wheels, a pair of seed hoppers mounted upon the supporting frame for adjustment toward or from each other, seed dropping means mounted in each seed hopper, means actuated by the axle for causing the actuation of the seed dropping devices at predetermined intervals, said means permitting the seed hoppers to be shifted toward or from each other, fertilizer containers mounted upon the supporting frame rearward of said hoppers and adjustable toward or from each other, means for discharging fertilizer from each of the fertilizer containers including sprocket wheels and an endless chain, one of said sprocket wheels having a driving shaft extending laterally toward the center of the supporting frame, a tubular shaft into which the driving shafts of both fertilizer containers telescope, adjustable means for clutching the driving shafts of the fertilizer containers to said tubular shaft, means for driving the tubular shaft including a sprocket wheel loosely mounted upon the axle, and a sprocket wheel on the tubular shaft, the sprocket chain connecting said sprocket wheels, and a pair of clutches manually shiftable to connect the sprocket wheel on the axle operatively with said axle or disconnect it therefrom.

4. In a planter of the character described, a supporting frame, traction wheels therefor, an axle driven thereby, oppositely disposed seed planting mechanisms carried upon the supporting frame and including seed dropping means, and means for actuating the two seed dropping means at intervals comprising a wheel rotated by the axle and disposed between the seed planting mechanism, the wheel having on opposite faces thereof a sinuous track composed of alternate elevations and depressions, the track being arranged concentrically to the center of the wheel, and means operatively connected to the seed dropping mechanisms and the wheel for actuating the seed dropping mechanisms including two rollers engageable one on each side of said wheel and with the corresponding sinuous track, the rollers being resiliently urged against said tracks.

5. In a seed planter of the character described, a planting mechanism therefor, seed dropping mechanism therefor, and means for actuating the seed dropping mechanism at selected intervals including a wheel having a plurality of concentric series of alternate elevated and depressed portions, the elevated portions of one series being spaced from each other a different distance from the elevated portions of any other series, and actuating means for the seed dropping mechanism adjustable into engagement with any one of said series.

6. In a seed planter of the character described, planting mechanism, two seed dropping mechanisms therefor disposed on opposite sides of the planter, and means for actuating said mechanism at selected intervals including a wheel disposed between the seed planting mechanisms and having on each face a plurality of sinuous tracks concentric to each other, each track being composed of alternate elevations and depressions, the elevations of one track being spaced from each other a different distance than the elevations of any other track, and actuating means for the two seed planters including rollers engageable one with each side of the wheel, said rollers being adjustable to engage with any one of said tracks.

In testimony whereof I hereunto affix my signature.

WILLIAM T. SNYDER.